US010227827B2

(12) United States Patent
Webb et al.

(10) Patent No.: US 10,227,827 B2
(45) Date of Patent: Mar. 12, 2019

(54) METHODS OF FORMING POLYCRYSTALLINE DIAMOND COMPACTS AND EARTH-BORING TOOLS

(71) Applicant: Baker Hughes Incorporated, Houston, TX (US)

(72) Inventors: Steven W. Webb, The Woodlands, TX (US); Anthony A. DiGiovanni, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 702 days.

(21) Appl. No.: 14/848,619

(22) Filed: Sep. 9, 2015

(65) Prior Publication Data

US 2017/0067293 A1 Mar. 9, 2017

(51) Int. Cl.
*E21B 10/56* (2006.01)
*C04B 35/52* (2006.01)
(Continued)

(52) U.S. Cl.
CPC .......... *E21B 10/56* (2013.01); *B01J 3/06* (2013.01); *B24D 3/10* (2013.01); *C04B 35/52* (2013.01);
(Continued)

(58) Field of Classification Search
CPC .... B24D 3/00; B24D 3/06; B24D 3/10; E21B 10/00; E21B 10/42; E21B 10/44; E21B 10/46; E21B 10/55; E21B 10/56; E21B 10/567; B01J 3/06; C01B 32/25; C04B 2235/5454; C04B 2235/404; C04B 2235/3847; C04B 2235/427; C04B 2235/786
See application file for complete search history.

(56) References Cited

U.S. PATENT DOCUMENTS 4,411,672 A 10/1983 Ishizuka
4,907,377 A 3/1990 Csillag et al.
(Continued)

OTHER PUBLICATIONS

Underwood, Quantitative Stereology, Addison-Wesley Publishing Company, Inc., 1970, pp. 103-105.

*Primary Examiner* — Jennifer A Smith
*Assistant Examiner* — Alexandra M Moore
(74) *Attorney, Agent, or Firm* — TraskBritt (57) ABSTRACT

A method of forming a polycrystalline diamond compact comprises providing metallized diamond particles including diamond particles including nanograins of a sweep catalyst secured thereto, the sweep catalyst comprising at least one of tungsten and tungsten carbide and constituting between about 0.01 weight percent and about 1.0 weight percent of the metallized diamond particles and placing the metallized diamond particles and a metal solvent catalyst in a container. The metallized diamond particles are subjected to a high-temperature, high-pressure process in the presence of the metal solvent catalyst to form a polycrystalline diamond material having inter-bonded diamond grains and nanograins of tungsten carbide, the nanograins of tungsten carbide covering less than about twenty percent of a surface area of the inter-bonded diamond grains. Polycrystalline diamond compacts and earth-boring tools including the polycrystalline diamond compacts are also disclosed.

20 Claims, 3 Drawing Sheets

(51) Int. Cl.
- *B01J 3/06* (2006.01)
- *E21B 10/46* (2006.01)
- *B24D 3/10* (2006.01)
- *C04B 35/528* (2006.01)
- *C04B 35/628* (2006.01)
- *C04B 35/645* (2006.01)
- *B24D 3/06* (2006.01)
- *C01B 32/25* (2017.01)

(52) U.S. Cl.
CPC ...... *C04B 35/528* (2013.01); *C04B 35/62831* (2013.01); *C04B 35/62842* (2013.01); *C04B 35/645* (2013.01); *E21B 10/46* (2013.01); *B24D 3/06* (2013.01); *C01B 32/25* (2017.08); *C04B 2235/3847* (2013.01); *C04B 2235/404* (2013.01); *C04B 2235/427* (2013.01); *C04B 2235/5454* (2013.01); *C04B 2235/786* (2013.01)

(56) References Cited

U.S. PATENT DOCUMENTS

| | | |
|---|---|---|
| 4,985,051 A * | 1/1991 | Ringwood ............... B01J 3/062 51/298 |
| 5,151,107 A | 9/1992 | Cho et al. |
| 6,261,329 B1 | 7/2001 | Ogata et al. |
| 6,372,346 B1 | 4/2002 | Toth |
| 7,556,668 B2 | 7/2009 | Eason et al. |
| 8,496,076 B2 | 7/2013 | DiGiovanni et al. |
| 8,727,042 B2 | 5/2014 | DiGiovanni |
| 8,758,463 B2 | 6/2014 | Cariveau et al. |
| 8,800,693 B2 | 8/2014 | DiGiovanni |
| 8,973,687 B2 | 3/2015 | DiGiovanni |
| 2010/0088969 A1 | 4/2010 | Kuroda et al. |
| 2012/0080240 A1 | 4/2012 | Green et al. |
| 2013/0008093 A1 | 1/2013 | DiGiovanni |
| 2013/0256039 A1 | 10/2013 | DiGiovanni et al. |
| 2014/0231150 A1 | 8/2014 | DiGiovanni |
| 2014/0325918 A1 | 11/2014 | Russell |
| 2014/0332287 A1 | 11/2014 | DiGiovanni |
| 2015/0041224 A1 | 2/2015 | DiGiovanni |

* cited by examiner

METHODS OF FORMING POLYCRYSTALLINE DIAMOND COMPACTS AND EARTH-BORING TOOLS

TECHNICAL FIELD

Embodiments of the disclosure relate generally to polycrystalline diamond materials and polycrystalline diamond compacts, earth-boring tools, and methods of forming such materials, compacts, and earth-boring tools.

BACKGROUND

Earth-boring tools for forming wellbores in subterranean earth formations may include a plurality of cutting elements secured to a body. For example, fixed-cutter earth-boring rotary drill bits (also referred to as "drag bits") include a plurality of cutting elements that are fixedly attached to a bit body of the drill bit. Similarly, roller-cone earth-boring rotary drill bits include cones that are mounted on bearing pins extending from legs of a bit body such that each cone is capable of rotating about the bearing pin on which the cone is mounted. A plurality of cutting elements may be mounted to each cone of the drill bit.

The cutting elements used in earth-boring tools often include polycrystalline diamond compact (often referred to as "PDC") cutting elements, which are cutting elements that include a polycrystalline diamond (PCD) material. Such polycrystalline diamond compact cutting elements are formed by sintering and bonding together relatively small diamond grains or crystals under conditions of high pressure and high temperature, typically in the presence of a metal solvent catalyst (such as cobalt, iron, nickel, or alloys or mixtures thereof) to form a layer or "table" of polycrystalline diamond material on a cutting element substrate. These processes are often referred to as high-pressure, high-temperature (of "HPHT") processes. The metal solvent catalyst material may be partially dispersed within and between the compacted diamond grains prior to HPHT sintering or during sintering processes to promote diamond-to-diamond bonding, and to harden and strengthen the compacted diamond powder table.

The cutting element substrate may include a cermet material (i.e., a ceramic-metal composite material) such as cobalt-cemented tungsten carbide. In such instances, the metal solvent catalyst (e.g., cobalt, or other catalyst material) in the cutting element substrate may be drawn or imbibed into the compacted diamond grains or crystals during sintering and promote formation of a diamond table by binding the diamond grains or crystals together. In other methods, the metal solvent catalyst material may be mixed with the diamond grains or crystals as a powder, prior to sintering the grains or crystals together in an HPHT process. The metal solvent catalyst may be added to a compacted diamond feed as a powder and may be mixed with the diamond powders prior to the HPHT process.

Additional catalyst materials may be present in the metal solvent catalyst. For example, additional catalyst materials may be drawn from the substrate with the metal solvent catalyst during HPHT processes or may be added to a diamond compact powder as a foil, powder, or transient compound prior to sintering. The additional catalyst material may promote liquid phase sintering of the diamond by wetting and dispersion of the metal solvent catalyst around and through the compacted diamond grains. Such additional catalysts are often referred to as sweep catalysts and may improve sintering of superhard materials under HPHT conditions.

Upon formation of a diamond table using the HPHT process, the metal solvent catalyst material may remain in interstitial spaces between the grains of diamond in the resulting polycrystalline diamond table. The presence of the metal solvent catalyst material in the diamond table may contribute to thermal damage therein when the cutting element is heated during use, due to friction at the contact point between the cutting element and the formation.

Polycrystalline diamond compact cutting elements in which the metal solvent catalyst material remains in the diamond table are generally thermally stable up to a temperature of about seven hundred fifty degrees Celsius (750° C.), although internal stress within the cutting element may begin to develop at temperatures exceeding about four hundred degrees Celsius (400° C.) due to a phase change that occurs in cobalt at that temperature (a change from the "beta" phase to the "alpha" phase). Also beginning at about four hundred degrees Celsius (400° C.), there is an internal stress component that arises due to differences in the thermal expansion of the diamond grains and the catalyst metal at the grain boundaries. This difference in thermal expansion may result in relatively large tensile stresses at the interface between the diamond grains, and contributes to thermal degradation of the microstructure when polycrystalline diamond compact cutting elements are used in service. Differences in the thermal expansion between the diamond table and the cutting element substrate to which it is bonded further exacerbate the stresses in the polycrystalline diamond compact. This differential in thermal expansion may result in relatively large compressive and/or tensile stresses at the interface between the diamond table and the substrate that eventually lead to the deterioration of the diamond table, cause the diamond table to delaminate from the substrate, or result in the general ineffectiveness of the cutting element.

Furthermore, at temperatures at or above about seven hundred fifty degrees Celsius (750° C.), some of the diamond crystals within the diamond table may react with the metal solvent catalyst material causing the diamond crystals to undergo a chemical breakdown or conversion to another allotrope of carbon. For example, the diamond crystals may graphitize or form amorphous or glassy carbon at the diamond crystal boundaries, which may substantially weaken the diamond table. Also, at extremely high temperatures, in addition to graphite and amorphous or glassy carbon, some of the diamond crystals may be converted to carbon monoxide and carbon dioxide.

In order to reduce the problems associated with differences in thermal expansion and chemical breakdown of the diamond crystals in polycrystalline diamond cutting elements, so called "thermally stable" polycrystalline diamond compacts (which are also known as thermally stable products, or "TSPs") have been developed. Such a thermally stable polycrystalline diamond compact may be formed by leaching the metal solvent catalyst material (e.g., cobalt) out from interstitial spaces between the inter-bonded diamond crystals in the diamond table using, for example, an acid or combination of acids (e.g., aqua regia). A substantial amount of the metal solvent catalyst material may be removed from the diamond table, or metal solvent catalyst material may be removed from only a portion thereof. Thermally stable polycrystalline diamond compacts in which substantially all metal solvent catalyst material has been leached out from the diamond table have been reported to be thermally stable up to temperatures of about twelve hundred degrees Celsius (1,200° C.). It has also been reported, however, that such fully leached diamond tables are relatively more brittle and vulnerable to shear, compressive, and tensile stresses than are non-leached diamond tables. In addition, it is difficult to secure a completely leached diamond table to a supporting substrate. In an effort to provide cutting elements having diamond tables that are more thermally stable relative to non-leached diamond tables, but that are also relatively less brittle and vulnerable to shear, compressive, and tensile stresses relative to fully leached diamond tables, cutting elements have been provided that include a diamond table in which the metal solvent catalyst material has been leached from a portion or portions of the diamond table. For example, it is known to leach metal solvent catalyst material from the cutting face, from the side of the diamond table, or both, to a desired depth within the diamond table, but without leaching all of the metal solvent catalyst material out from the diamond table.

BRIEF SUMMARY

Embodiments disclosed herein include methods of forming a polycrystalline diamond compact, as well as related polycrystalline diamond compacts and earth-boring tools. For example, in accordance with one embodiment, a method of forming a polycrystalline diamond compact comprises providing metallized diamond particles comprising diamond particles including nanograins of a sweep catalyst secured thereto, the sweep catalyst comprising at least one of tungsten and tungsten carbide and constituting between about 0.01 weight percent and about 1.0 weight percent of the metallized diamond particles, placing the metallized diamond particles and a metal solvent catalyst in a container, and subjecting the metallized diamond particles to a high-temperature, high-pressure process in the presence of the metal solvent catalyst to form a polycrystalline diamond material having inter-bonded diamond grains and nanograins of tungsten carbide, the nanograins of tungsten carbide covering less than about twenty percent of a surface area of the inter-bonded diamond grains.

In additional embodiments, a polycrystalline diamond compact comprises a plurality of inter-bonded diamond grains, nanograins of tungsten carbide on less than about twenty percent of a surface area of the inter-bonded diamond grains, the nanograins of tungsten carbide having an average grain size of between about 0.2 nm and about 500 nm, and a metal solvent catalyst in spaces between the plurality of inter-bonded diamond grains, wherein the polycrystalline diamond compact comprises at least five parts by weight of the metal solvent catalyst per one part by weight of the tungsten carbide.

In further embodiments, an earth-boring tool comprises a bit body, and at least one polycrystalline diamond compact cutting element. The at least one polycrystalline diamond compact cutting element comprises a plurality of inter-bonded diamond grains, nanograins of tungsten carbide on less than about twenty percent of a surface area of the inter-bonded diamond grains, the nanograins of tungsten carbide having an average grain size of between about 0.2 nm and about 500 nm, and a metal solvent catalyst in spaces between the plurality of inter-bonded diamond grains, the at least one polycrystalline diamond compact cutting element comprising at least five parts by weight of the metal solvent catalyst per one part by weight of the tungsten carbide.

DETAILED DESCRIPTION

Illustrations presented herein are not meant to be actual views of any particular material, component, or system, but are merely idealized representations that are employed to describe embodiments of the disclosure.

The following description provides specific details, such as material types, compositions, material thicknesses, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional techniques employed in the industry. In addition, the description provided below does not form a complete process flow for forming polycrystalline diamond compacts. Only those process acts and structures necessary to understand the embodiments of the disclosure are described in detail below. A person of ordinary skill in the art will understand that some process components are inherently disclosed herein and that adding various conventional process components and acts would be in accord with the disclosure. Additional acts or materials to form a polycrystalline diamond compact may be performed by conventional techniques.

As used herein, the term "earth-boring tool" means and includes any type of bit or tool used for drilling during the formation or enlargement of a wellbore and includes, for example, rotary drill bits, percussion bits, core bits, eccentric bits, bi-center bits, reamers, mills, drag bits, roller-cone bits, hybrid bits, and other drilling bits and tools known in the art.

As used herein, the term "grain size" means and includes a geometric mean diameter measured from a two-dimensional section through a bulk material. The geometric mean diameter for a group of particles may be determined using techniques known in the art, such as those set forth in Ervin E. Underwood, QUANTITATIVE STEREOLOGY, 103-105 (Addison-Wesley Publishing Company, Inc., 1970), the disclosure of which is incorporated herein in its entirety by this reference. As known in the art, the average grain size of grains within a microstructure may be determined by measuring grains of the microstructure under magnification. For example, a scanning electron microscope (SEM), a field emission scanning electron microscope (FESEM), or a transmission electron microscope (TEM) may be used to view or image a surface or a section of a polycrystalline diamond material (e.g., a polished and etched surface of the polycrystalline diamond material). Commercially available vision systems are often used with such microscopy systems, and these vision systems are capable of measuring the average grain size of grains within a microstructure.

As used herein, the term "nanograin" means and includes any grain of material having an average grain size (e.g., an average grain diameter) of about 500 nm or less.

As used herein, the term "inter-granular bond" means and includes any direct atomic bond (e.g., covalent, ionic, metallic, etc.) between atoms in adjacent grains of material.

Methods of forming polycrystalline diamond compacts and methods of forming earth-boring tools including the polycrystalline diamond compacts are described, as are related polycrystalline diamond compacts and earth-boring tools. Polycrystalline diamond compacts may be formed by sintering a mixture of diamond particles in the presence of a metal solvent catalyst material and a sweep catalyst under HTHP conditions to form inter-bonded diamond grains. The metal solvent catalyst material may include cobalt, iron, nickel, and alloys thereof and may facilitate formation of diamond-to-diamond bonds. The sweep catalyst may facilitate wetting of the diamond particles with the metal solvent catalyst material. The sweep catalyst may include nanograins and may include, in some embodiments, tungsten or tungsten carbide. The sweep catalyst may be secured to (e.g., bonded to) the diamond particles prior to sintering and may be substantially uniformly dispersed on the diamond particles. The sweep catalyst may be secured to the diamond particles by chemical vapor deposition, atomic layer deposition, or other methods whereby a bond is formed between the diamond particles and the sweep catalyst to form metallized particles to be sintered. The sweep catalyst may cover less than an entire surface of the diamond particles (e.g., may not comprise a film over the diamond particles) and may constitute a substantially low weight percent of the sintered polycrystalline diamond compact. The sintered polycrystalline diamond compact may include a lower weight percent of the sweep catalyst and the metal solvent catalyst material than conventional polycrystalline diamond compacts while exhibiting more inter-granular diamond-to-diamond bonds, a higher volume percent of diamond grains, a higher hardness, and improved wear resistance and thermal stability relative to conventional PDC cutting elements.

Figure 1:
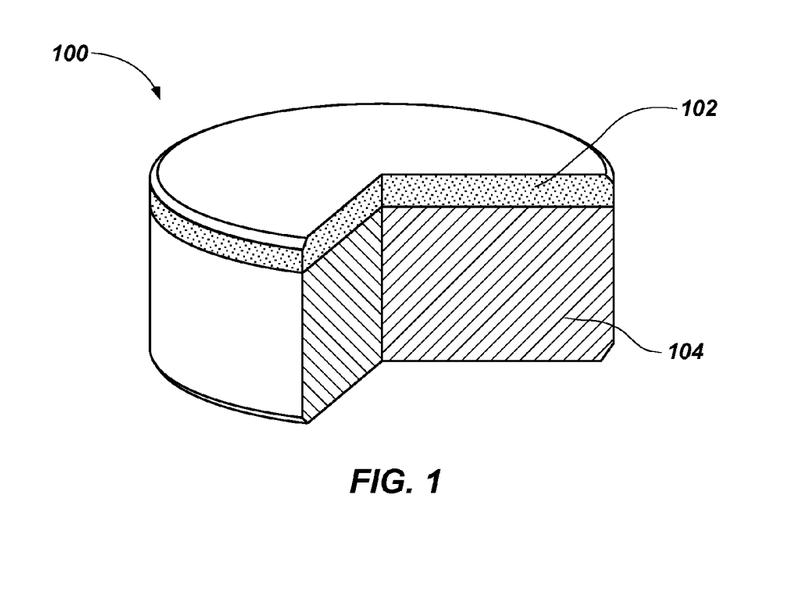
FIG. 1 is a partially cut-away perspective view of an embodiment of a polycrystalline diamond compact cutting element including a volume of polycrystalline diamond material, in accordance with an embodiment of the disclosure.

FIG. 1 illustrates a cutting element 100, which may be formed as disclosed herein. The cutting element 100 includes a polycrystalline diamond material 102. Optionally, the cutting element 100 may also include a substrate 104 to which the polycrystalline diamond material 102 may be bonded, or on which the polycrystalline diamond material 102 is formed under HPHT conditions, as described herein. The polycrystalline diamond material 102 may be in the form of a table (i.e., a layer) of polycrystalline diamond material 102 on the substrate 104, as shown in FIG. 1. The polycrystalline diamond material 102 may be provided on (e.g., formed on or secured to) a surface of the substrate 104. In additional embodiments, the cutting element 100 may simply be a volume of the polycrystalline diamond material 102 having any desirable shape, and may not include any substrate 104. The cutting element 100 may be referred to as "polycrystalline diamond compact" cutting element.

The substrate 104 may be formed from a material that is relatively hard and resistant to wear. For example, the substrate 104 may be formed from and include a ceramic-metal composite material (which are often referred to as "cermet" materials). The substrate 104 may include a cemented carbide material, such as a cemented tungsten carbide material, in which tungsten carbide particles are cemented together in a metallic binder material. The metallic binder material may include, for example, cobalt, nickel, iron, or alloys and mixtures thereof. For example, the substrate 104 may include a generally cylindrical body of cobalt-cemented tungsten carbide material, although substrates of different geometries and compositions may also be employed.

Figure 2:
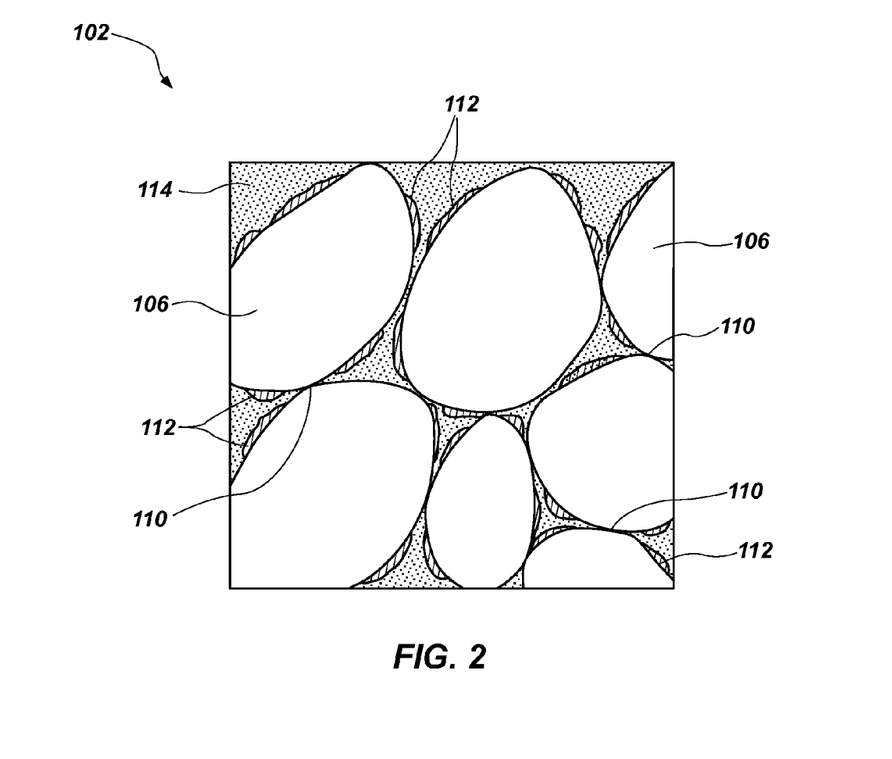
FIG. 2 is a simplified schematic illustrating how a microstructure of the polycrystalline diamond compact of FIG. 1 may appear under magnification.

FIG. 2 illustrates the polycrystalline diamond material 102 including interspersed and inter-bonded diamond grains 106 forming a three-dimensional network of the polycrystalline diamond material 102. The polycrystalline diamond material 102 may include direct inter-granular bonds 110 between the diamond grains 106. The inter-granular bonds 110 may include diamond-to-diamond bonds. The diamond grains 106 may have average particle dimensions (e.g., mean diameters) of between about 1 µm and about 35 µm, such as between about 1 µm and about 5 µm, between about 5 µm and about 10 between about 10 µm and about 20 µm, or between about 20 µm and about 35 µm. In some embodiments, the diamond grains 106 may have a polymodal size distribution including grains having a plurality of sizes (e.g., bi-modal, tri-modal, etc.). In other embodiments, the diamond grains 106 may have a monomodal grain size distribution.

A metal solvent catalyst material 114 may be dispersed in spaces between diamond grains 106 of the polycrystalline diamond material 102. The metal solvent catalyst material 114 may be formulated to promote formation of inter-granular bonds 110 during sintering of the polycrystalline diamond material 102, such as by wetting of surfaces of diamond particles that form the diamond grains 106 during sintering. The metal solvent catalyst material 114 may be located in spaces between the plurality of inter-granular bonds 110. The metal solvent catalyst material 114 may include, for example and without limitation, cobalt, iron, nickel, or an alloy or mixture thereof. In some embodiments, the metal solvent catalyst material 114 includes cobalt.

A sweep catalyst 112 may be secured to (e.g., bonded to) at least some surfaces of the diamond grains 106. In some embodiments, the sweep catalyst 112 is formulated to promote wetting of the diamond grains 106 by the metal solvent catalyst material 114 and may, therefore, promote formation of the inter-granular bonds 110.

The sweep catalyst 112 may include carbides of metals or base metals having an atomic number greater than about 22, such as carbides of refractory metals including, for example, titanium, vanadium, chromium, zirconium, niobium, molybdenum, hafnium, tantalum, tungsten, rhenium, ruthenium, rhodium, osmium, and iridium. For example, the sweep catalyst 112 may include titanium carbide (TiC), vanadium carbide (VC), chromium carbide (e.g., $Cr_3C_2$), zirconium carbide (ZrC), niobium carbide (e.g., NbC), molybdenum carbide ($Mo_2C$), hafnium carbide (HfC), tantalum carbide (TaC), tungsten carbide (e.g., WC), rhenium carbide ($ReC_x$), ruthenium carbide (RuC), rhodium carbide (e.g., RhC), osmium carbide (OsC), and iridium carbide (IrC). In some embodiments, the sweep catalyst 112 includes tungsten carbide.

The sweep catalyst 112 may include nanograins having a grain size less than about 500 nm. In some embodiments, the sweep catalyst 112 has a grain size as small as, for example, a monolayer of the sweep catalyst 112. For example, the nanograins may have a grain size of between about 0.2 nm and about 500 nm, such as between about 0.2 nm and about 0.5 nm, between about 0.5 nm and about 1.0 nm, between about 1 nm and about 10 nm, between about 10 nm and about 100 nm, between about 100 nm and about 200 nm, or between about 200 nm and about 500 nm. The sweep catalyst 112 may be disposed in interstitial spaces between the diamond grains 106.

The sweep catalyst 112 may constitute between about 0.01 weight percent and about 1.0 weight percent of the polycrystalline diamond material 102, such as between about 0.05 weight percent and about 0.75 weight percent, between about 0.1 weight percent and about 0.5 weight percent, or between about 0.2 weight percent and about 0.4 weight percent of the polycrystalline diamond material 102.

In some embodiments, the sweep catalyst 112 may be substantially uniformly distributed on the diamond grains 106 and the sweep catalyst 112 may be present on (e.g., bonded to) substantially all of the diamond grains 106.

Figure 3:
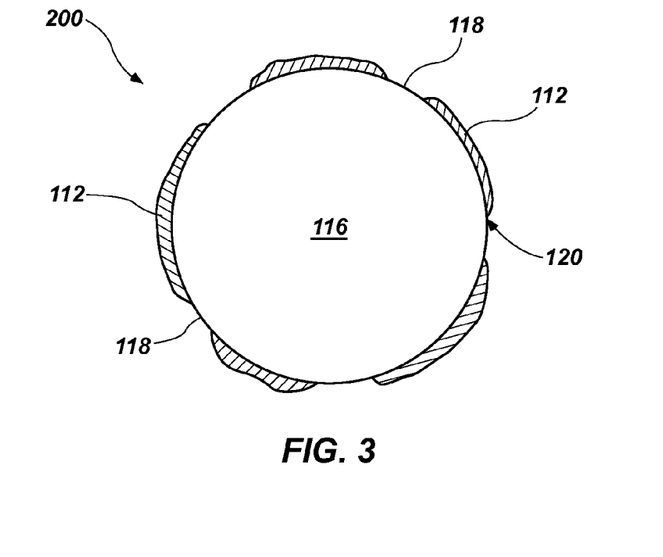
FIG. 3 is a simplified schematic of a metallized particle including a diamond grain with nanograins of sweep catalyst secured thereto, in accordance with an embodiment of the disclosure.

Referring now to FIG. 3, a simplified schematic of a metallized particle 200 is shown. The metallized particle 200 may include a diamond particle 116 (from which the interbonded diamond grains 106 will be formed) on which nanograins of the sweep catalyst 112 are secured. The sweep catalyst 112 may be substantially the same as described above with reference to FIG. 2 except that the sweep catalyst 112 has not been compacted or sintered to form the polycrystalline diamond material 102. In some embodiments, the sweep catalyst 112 includes carbides that are chemically bonded to the surface of the diamond particle 116.

The sweep catalyst 112 may be bonded to a surface of the diamond particle 116. By way of nonlimiting example, the sweep catalyst 112 may react with carbon from the diamond particle 116 to form a carbide of the sweep catalyst 112 on the diamond particle 116. It is contemplated that, in some embodiments, a portion of the diamond particle 116 may be graphitized and the sweep catalyst 112 may overlie at least a portion of the diamond particle 116 that includes $sp^2$ hybridized carbon (e.g., graphite). In some such embodiments, a layer of graphite may intervene between the diamond particle 116 and the sweep catalyst 112.

The sweep catalyst 112 may cover (e.g., overlie) only a portion of an exterior surface of the diamond particle 116. In some embodiments, the sweep catalyst 112 may directly overlie and contact the diamond particle 116. In other embodiments, the sweep catalyst 112 may overlie the diamond particle 116 but may include at least some portions that do not directly contact the diamond particle 116. By way of nonlimiting example, the sweep catalyst 112 may comprise a dome or bubble over the diamond particle 116 and may include porous regions between the sweep catalyst 112 and the diamond particle 116.

In some embodiments, the sweep catalyst 112 overlies less than about 20 percent of a surface area of the diamond particle 116, such as less than about 10 percent, less than about 5 percent, or less than about 1 percent of the surface area of the diamond particle 116. In other embodiments, the sweep catalyst 112 may overlie an average of between about 1 percent and about 100 percent of a surface area of the diamond particle 116, such as between about 1 percent and about 5 percent, between about 5 percent and about 10 percent, between about 10 percent and about 20 percent, between about 20 percent and about 50 percent, or between about 50 percent and about 100 percent. Accordingly, the diamond particle 116 may include at least some exposed surfaces 118 that are not covered or contacted with the sweep catalyst 112. It is contemplated that, in some embodiments, the sweep catalyst 112 may be disposed on surfaces of the diamond particle 116 as discrete islands of sweep catalyst 112 material. In some such embodiments, the sweep catalyst 112 may not form a film or a substantially continuous coating on the diamond particles 116. A size of the islands of sweep catalyst 112 may be between about 0.2 nm and about 1 μm, such as between about 0.2 nm and about 0.5 nm, between about 0.5 nm and about 1.0 nm, between about 1.0 nm and about 10 nm, between about 10 nm and about 100 nm, or between about 100 nm and about 1 μm. A distance between adjacent islands of sweep catalyst 112 on the surfaces of the diamond particle 116 may be between about 50 nm and about 5 μm, such as between about 50 nm and about 100 nm, between about 100 nm and about 500 nm, between about 500 nm and about 1 μm, or between about 1 μm and about 5 μm.

Although FIG. 3 illustrates the sweep catalyst 112 as discrete nanograins on surfaces of the diamond particles 116, in some embodiments, the sweep catalyst 112 may comprise a layer over the diamond particle 116. By way of example, the sweep catalyst 112 may constitute a layer of material having a thickness of a single monolayer to about 500 nm, such as such as between about 0.2 nm and about 0.5 nm, between about 0.5 nm and about 1.0 nm, between about 1.0 nm and about 10 nm, between about 10 nm and about 100 nm, or between about 100 nm and about 500 nm on the diamond grains 106.

The sweep catalyst 112 may be formed on the diamond particles 116 by, for example, atomic layer deposition (ALD), chemical vapor deposition (CVD), physical vapor deposition (PVD), sputtering, the sol-gel process, solution-based electro-plating, combinations thereof, or other suitable method for attaching sweep catalyst 112 to the diamond particles 116. In some embodiments, the sweep catalyst 112 is attached to the diamond particles 116 by CVD.

The CVD process may occur under an initial high vacuum, such as at a pressure of less than about $10^{-7}$ torr. Working pressures may be varied by increasing or decreasing argon or other inert gas (e.g., helium, nitrogen, etc.) flow rates. In this manner, the deposition rates of the sweep catalyst 112 may be varied as desired to control, for example, size and thickness.

The CVD process may include exposing the diamond particles 116 to one or more metallic precursors of the sweep catalyst 112 and one or more reducing agents under vacuum conditions and elevated temperatures. The metallic precursor may include tungsten hexafluoride ($WF_6$), tungsten hexachloride ($WCl_6$), tungsten hexacarbonyl ($W(CO)_6$) or combinations thereof. The reducing agent may include hydrogen, methane, or combinations thereof. In some embodiments, the diamond particles 116 may be heated and exposed to a tungsten precursor and the reducing agent to deposit tungsten sweep catalyst 112 on the diamond particles 116. The diamond particles 116 may be fluidized or tumbled during exposure of the diamond particles 116 to the metallic precursor and the reducing agent.

In some embodiments, the sweep catalyst 112 is formed on surfaces of the diamond particles 116 at a temperature sufficient to form a carbide at an interface 120 between the diamond particles 116 and the sweep catalyst 112. For example, where the sweep catalyst 112 is formed by CVD, the sweep catalyst 112 may, in some embodiments, react with carbon from the diamond particles 116 to form a carbide, such as when a temperature of the CVD reactor is above about 500° C. Accordingly, the metallized particles 200 may include diamond particles 116 including nanograins of refractory metal carbides, such as tungsten carbide.

In some embodiments, the interface 120 includes a higher weight percent of tungsten carbide than exposed portions of the sweep catalyst 112. By way of example, the sweep catalyst 112 may include a gradient of tungsten carbide with a higher weight percent tungsten carbide at the interface 120 than at exposed portions of the sweep catalyst 112.

Figure 4:
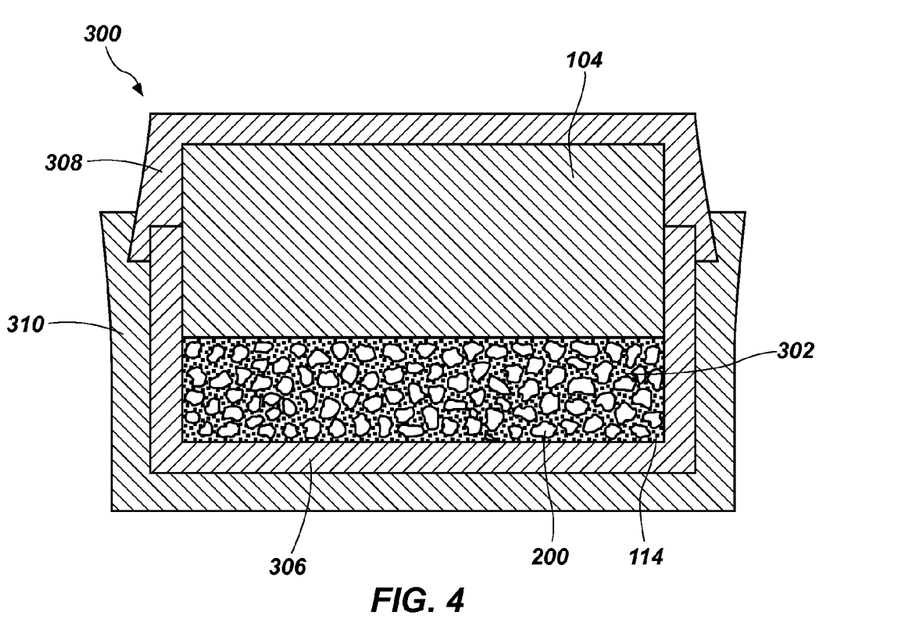
FIG. 4 is a simplified cross-sectional side view illustrating a method of forming a polycrystalline diamond compact, in accordance with an embodiment of the disclosure.

In some embodiments, methods of forming the polycrystalline diamond material 102 (FIG. 2) may include HPHT sintering of the metallized particles 200 in the presence of the metal solvent catalyst material 114 (FIG. 2). Referring to FIG. 4, the metallized particles 200 may be placed into contact with the metal solvent catalyst material 114 to form a mixture 302 of the metallized particles 200 and the metal solvent catalyst material 114. In some embodiments, the mixture 302 consists essentially of the metallized particles 200 and the metal solvent catalyst material 114. In some embodiments, the metal solvent catalyst material 114 may be provided in the substrate 104 and may sweep through the metallized particles 200 during sintering.

The mixture 302 may be positioned within a container 300 (e.g., a metal canister). The metallized particles 200 may be substantially the same as described above with reference to FIG. 3. The metal solvent catalyst material 114 may include, for example, cobalt, iron, nickel, and combinations thereof, as described above. The container 300 may include an inner cup 306 in which the mixture 302 is provided. In some embodiments, the substrate 104 (FIG. 1) optionally may be provided in the inner cup 306 over or under the mixture 302, and may ultimately be encapsulated in the container 300. The container 300 may further include a top cover 308 and a bottom cover 310, which may be assembled and bonded together (e.g., swage bonded) around the inner cup 306 with the mixture 302 and the optional substrate 104 therein.

In the container 300, the metallized particles 200 may have a packing fraction from about 45% to about 99% (i.e., with a void space of between about 55% and about 1% of the total volume), such as from about 50% to about 70% (i.e., with a void space of between about 50% and about 30% of the total volume).

The container 300 and the mixture 302 therein may be subjected to an HPHT process to form a polycrystalline diamond material (e.g., the polycrystalline diamond material 102 (FIG. 2)). For example, the container 300 may be subjected to a pressure of at least about 5.5 GPa and a temperature of at least about 1,000° C. In some embodiments, the container 300 may be subjected to a pressure of at least about 6.0 GPa, or even at least about 6.5 GPa. For example, the container 300 may be subjected to a pressure from about 5.5 GPa to about 10.0 GPa, or from about 6.5 GPa to about 8.0 GPa. The container 300 may be subjected to a temperature of at least about 1,100° C., at least about 1,200° C., at least about 1,300° C., at least about 1,400° C., or even at least about 1,500° C. HTHP conditions may be maintained for a period of time from about 30 seconds to about 60 minutes to sinter the metallized particles 200 and form the polycrystalline diamond material 102. During sintering, the metal solvent catalyst material 114 (such as from the substrate 104) may be drawn into the metallized particles 200 and serve as a catalyst for forming a diamond table from the metallized particles 200. The sweep catalyst 112 secured to the diamond particles 116 (FIG. 3) may enhance a rate of sweep of the metal solvent catalyst material 114 through and between the metallized particles 200 while subjecting the metallized particles 200 to the high-temperature, high-pressure process in the presence of the metal solvent catalyst material 114. In some embodiments, additional sweep catalyst 112 material may be drawn into the metallized particles 200 from the substrate 104.

In some embodiments, the sintering process may be carried out at a lower temperature than in conventional sintering processes. While not wishing to be bound by any particular theory, it is believed that because the nanograins of the sweep catalyst 112 are bonded to the diamond particles 116 prior to sintering, the sweep catalyst 112 facilitates wetting of the diamond particles 116 at lower temperatures. Further, it is believed that because the nanograins of sweep catalyst 112 are smaller than, for example, grains of powdered materials that may be used as the sweep catalyst, the nanograins of sweep catalyst 112 facilitate wetting of the diamond particles 116 at lower temperatures. Accordingly, the sintering process may be carried out at temperatures that may reduce the amount of graphitization of the diamond material of the diamond grains 106.

The polycrystalline diamond material 102 formed during the sintering process may include the metal solvent catalyst material 114 and the sweep catalyst 112. A ratio of the metal solvent catalyst material 114 to the sweep catalyst 112 may be greater than about 4.0, such as greater than about 5.0, greater than about 6.0, greater than about 7.0, or even greater than about 10.0, as may be determined by X-ray fluorescence or other suitable methods. In other words, the polycrystalline diamond material 102 may comprise at least four parts by weight of the metal solvent catalyst material 114 per one part by weight of the sweep catalyst 112, such as at least five parts by weight, at least six parts by weight, at least seven parts by weight, at least eight parts by weight, at least nine parts by weight, or at least ten parts by weight of the metal solvent catalyst material 114 per one part by weight of the sweep catalyst 112. In some embodiments, the ratio of the metal solvent catalyst material 114 to the sweep catalyst 112 is between about 5.0 and about 10.0. The polycrystalline diamond material 102 may exhibit improved thermal stability than polycrystalline diamond materials having a lower ratio of the metal solvent catalyst to the sweep catalyst. It is believed that by forming the polycrystalline diamond material 102 from nanograins of the sweep catalyst 112, the sweep catalyst is uniformly dispersed on the diamond grains 106 and more substantially facilitates wetting of the diamond particles 116 during sintering. Accordingly, more inter-granular bonds 110 between diamond grains 106 may be formed with less metal solvent catalyst material 114 and with less sweep catalyst 112, increasing the thermal stability of the polycrystalline diamond material 102.

In a volume of polycrystalline diamond material 102, the polycrystalline diamond material 102 typically occupies less than 100% of the total volume of the polycrystalline diamond table due to the inclusion of interstitial spaces. The polycrystalline diamond material 102 described herein and having the sweep catalyst 112 secured thereto may exhibit a relatively higher volume percentage of polycrystalline diamond material 102 than conventional polycrystalline diamond materials. For example, the polycrystalline diamond material 102 may include at least about 92% polycrystalline diamond by volume, as at least about 94% polycrystalline diamond by volume, at least about 95% polycrystalline diamond by volume, at least about 96% polycrystalline diamond by volume, at least about 97% polycrystalline diamond by volume, or even at least about 98% polycrystalline diamond by volume. In general, higher volume fractions of hard materials may exhibit better wear resistance, abrasion resistance, and improved resistance to thermal degradation. Because the sweep catalyst 112 comprises nanograins, a smaller volume percent of the sweep catalyst 112 is used and effective for wetting surfaces of the diamond particles 116 during sintering. In addition, the nanograins of sweep catalyst 112 cover a lower surface area of the diamond particles 116 to be sintered, facilitating effective wetting of the diamond particles 116 at a lower volume percent of the metal solvent catalyst material 114. Further, the nanograins of sweep catalyst 112 are small enough to contact the diamond particles 116 at surfaces proximate where inter-granular bonds 110 will be formed during sintering, increasing wetting of the diamond particles 116 at such areas and increasing direct inter-granular bonds 110 between diamond grains 106. Accordingly, the polycrystalline diamond material 102 may have a higher volume percent of diamond grains 106, with more inter-granular bonds 110 between the diamond grains 106. It is believed that the increased number of inter-granular bonds 110 between diamond grains 106 increases the hardness and wear resistance of the sintered polycrystalline diamond material 102.

Surprisingly, the polycrystalline diamond material 102 including nanograins of the sweep catalyst 112 exhibits higher hardness than conventional polycrystalline diamond materials, even at higher temperatures, such as at least about 800° C. By way of example, a wear surface (e.g., a wear scar area) of a polycrystalline diamond material 102 including the nanograins of sweep catalyst 112 used to cut a hard formation was compared to a wear surface of a polycrystalline diamond material that did not include nanograins of the sweep catalyst 112. The polycrystalline diamond material 102 with the sweep catalyst 112 exhibited a substantially lower wear scar area than the polycrystalline diamond material that did not include the sweep catalyst 112. Without wishing to be bound by any particular theory, it is believed that because the sweep catalyst 112 is secured to the diamond particles 116 prior to sintering (as opposed to mixed with diamond particles 116 in a powder blending process), the sweep catalyst 112 is substantially uniformly dispersed on and within the diamond particles 116, reducing agglomeration and aggregates (e.g., clusters) of the metal solvent catalyst material 114 and the sweep catalyst 112. In addition, securing the sweep catalyst 112 to the diamond particles 116 by CVD may reduce the formation of oxides on the resulting diamond grains 106 and in the sintered polycrystalline diamond material 102. By way of comparison, oxide may be present on diamond particles prepared by powder blending.

After sintering the mixture 302 to form the polycrystalline diamond material 102, at least a portion of the metal solvent catalyst material 114 and the sweep catalyst 112 may be removed from the interstitial spaces in the polycrystalline diamond material 102 to form an at least partially leached polycrystalline compact.

Removal of the metal solvent catalyst material 114 may be performed by conventional means, such as by placing the polycrystalline diamond material 102 in an acid bath. Such a process may be referred to in the art as leaching, or acid-leaching. By way of example and not limitation, the polycrystalline diamond material 102 may be leached using a leaching agent such as aqua regia (a mixture of concentrated nitric acid ($HNO_3$) and concentrated hydrochloric acid (HCl)) may be used to at least substantially remove the metal solvent catalyst material 114 from the interstitial spaces between inter-bonded diamond grains 106 in the polycrystalline diamond material 102. In other embodiments, the leaching agent may include boiling hydrochloric acid and boiling hydrofluoric acid (HF).

After leaching the polycrystalline diamond material 102, at least some of the interstitial spaces between the inter-bonded diamond grains 106 within the polycrystalline diamond material 102 may be at least substantially free of the metal solvent catalyst material 114 and the sweep catalyst 112. At least a portion of the polycrystalline diamond material 102 may include the metal solvent catalyst material 114 and the sweep catalyst 112 (e.g., portions that are not leached, such as portions that are away from cutting faces of the polycrystalline diamond material 102).

Figure 5:
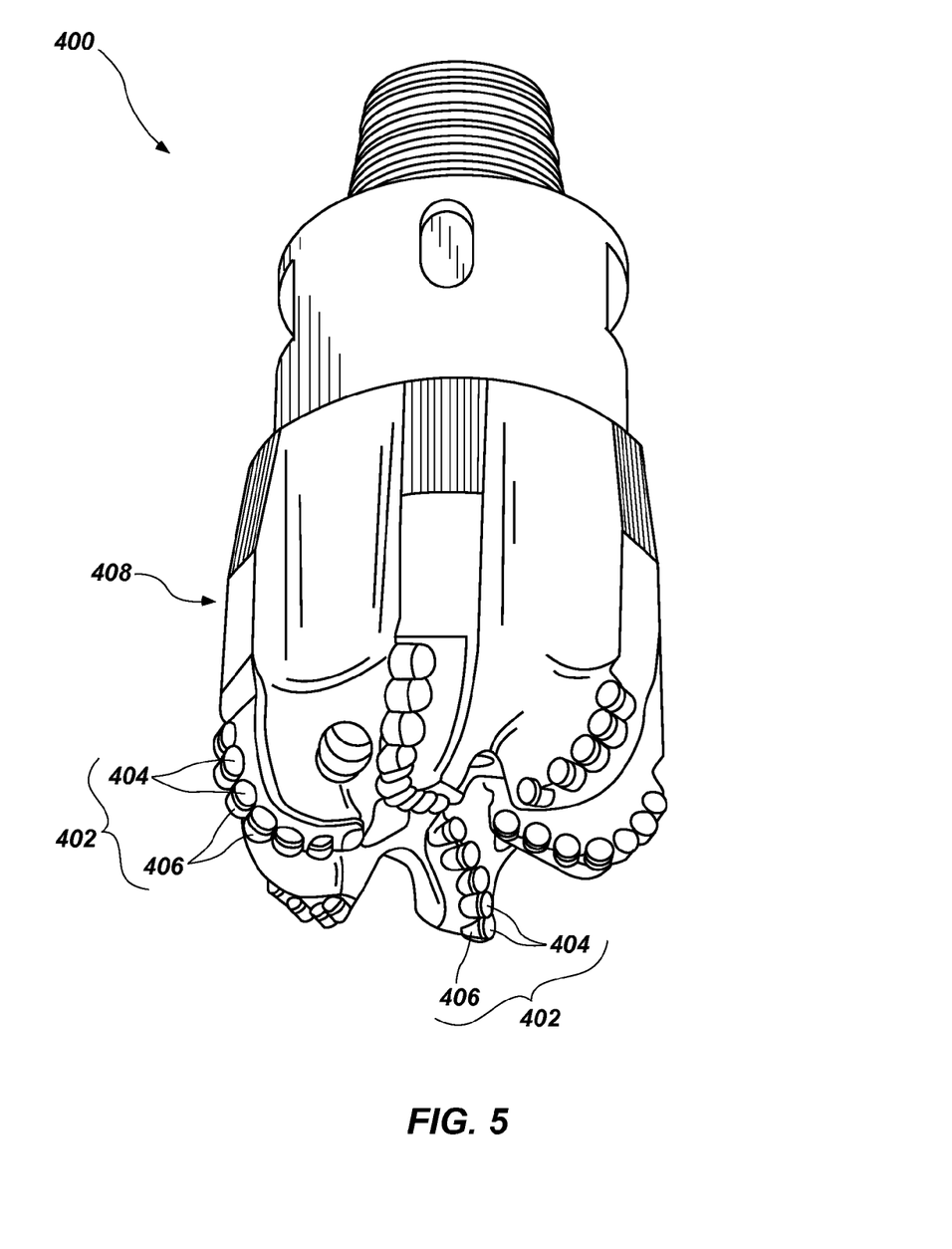
FIG. 5 is a perspective view of an embodiment of a fixed cutter earth-boring rotary drill bit that includes a plurality of polycrystalline diamond compacts like the polycrystalline diamond compact illustrated in FIG. 1, in accordance with an embodiment of the disclosure.

Embodiments of cutting elements 100 (FIG. 1) that include polycrystalline diamond material 102 fabricated as described herein may be mounted to earth-boring tools and used to remove subterranean formation material. FIG. 5 illustrates a fixed-cutter earth-boring rotary drill bit 400 that includes a plurality of polycrystalline diamond compact cutting elements 402, each of which includes a polycrystalline diamond compact comprising polycrystalline diamond material 404 on an optional substrate 406. The polycrystalline diamond compact cutting elements 402 may be the cutting elements 100 (FIG. 1) previously described herein. The earth-boring rotary drill bit 400 includes a bit body 408, and the polycrystalline diamond compact cutting elements 402 are bonded to the bit body 408. The polycrystalline diamond compact cutting elements 402 may be brazed or otherwise secured within pockets in the outer surface of the bit body 408. The polycrystalline diamond material 102 may or may not be leached before mounting on the bit body 408. Other types of earth-boring tools, such as roller cone bits, percussion bits, hybrid bits, reamers, etc., also may include polycrystalline diamond compact cutting elements 100 as described herein.

Additional non limiting example embodiments of the disclosure are described below.

Embodiment 1

A method of forming a polycrystalline diamond compact, the method comprising: providing metallized diamond particles comprising diamond particles including nanograins of a sweep catalyst secured thereto, the sweep catalyst comprising at least one of tungsten and tungsten carbide and constituting between about 0.01 weight percent and about 1.0 weight percent of the metallized diamond particles; placing the metallized diamond particles and a metal solvent catalyst in a container; and subjecting the metallized diamond particles to a high-temperature, high-pressure process in the presence of the metal solvent catalyst to form a polycrystalline diamond material having inter-bonded diamond grains and nanograins of tungsten carbide, the nanograins of tungsten carbide covering less than about twenty percent of a surface area of the inter-bonded diamond grains.

Embodiment 2

The method of Embodiment 1, wherein placing the metallized diamond particles and a metal solvent catalyst in a container further comprises placing the metallized diamond particles adjacent to a substrate in a container, the substrate including the metal solvent catalyst, the method further comprising enhancing, by the presence of the sweep catalyst secured to the diamond particles, a rate of sweep of the metal solvent catalyst through and between the diamond particles while subjecting the metallized diamond particles to the high-temperature, high-pressure process in the presence of the metal solvent catalyst.

Embodiment 3

The method of Embodiment 1 or Embodiment 2, wherein providing metallized diamond particles comprising diamond particles including nanograins of a sweep catalyst secured thereto comprises providing diamond particles including discrete grains of at least one of tungsten and tungsten carbide having an average grain size of between about 0.2 nm and about 500 nm secured thereto.

Embodiment 4

The method of any one of Embodiments 1 through 3, wherein providing metallized diamond particles comprising diamond particles including nanograins of a sweep catalyst secured thereto comprises forming the sweep catalyst on surfaces of the diamond particles by chemical vapor deposition.

Embodiment 5

The method of Embodiment 4, wherein forming the sweep catalyst on surfaces of the diamond particles by chemical vapor deposition comprises exposing the diamond particles to at least one of tungsten hexafluoride, tungsten hexachloride, and tungsten (hexa)carbonyl.

Embodiment 6

The method of any one of Embodiments 1 through 5, further comprising selecting the metal solvent catalyst to comprise cobalt.

Embodiment 7

The method of any one of Embodiments 1 through 6, further comprising selecting the metallized diamond particles to consist essentially of the diamond particles and tungsten carbide.

Embodiment 8

The method of any one of Embodiments 1 through 7, wherein providing metallized diamond particles comprising diamond particles including nanograins of a sweep catalyst secured thereto comprises providing diamond particles having about one monolayer of tungsten or tungsten carbide thereon.

Embodiment 9

The method of any one of Embodiments 1 through 8, wherein subjecting the metallized diamond particles to a high-temperature, high-pressure process in the presence of the metal solvent catalyst to form a polycrystalline diamond material comprises forming the polycrystalline diamond material to have tungsten carbide covering less than about five percent of the surface area of the inter-bonded diamond grains.

Embodiment 10

The method of any one of Embodiments 1 through 8, wherein subjecting the metallized diamond particles to a high-temperature, high-pressure process in the presence of the metal solvent catalyst to form a polycrystalline diamond material comprises forming the polycrystalline diamond material to have tungsten carbide covering less than about one percent of the surface area of the inter-bonded diamond grains.

Embodiment 11

The method of any one of Embodiments 1 through 10, wherein providing metallized diamond particles comprising diamond particles including nanograins of a sweep catalyst secured thereto comprises providing diamond particles coated with nanograins consisting essentially of tungsten carbide.

Embodiment 12

The method of any one of Embodiments 1 through 11, further comprising leaching the polycrystalline diamond material to remove at least a portion of the metal solvent catalyst and the sweep catalyst from at least a portion of the polycrystalline diamond material.

Embodiment 13

A polycrystalline diamond compact, comprising: a plurality of inter-bonded diamond grains; nanograins of tungsten carbide on less than about twenty percent of a surface area of the inter-bonded diamond grains, the nanograins of tungsten carbide having an average grain size of between about 0.2 nm and about 500 nm; and a metal solvent catalyst in spaces between the plurality of inter-bonded diamond grains; wherein the polycrystalline diamond compact comprises at least five parts by weight of the metal solvent catalyst per one part by weight of the tungsten carbide.

Embodiment 14

The polycrystalline diamond compact of Embodiment 13, wherein the plurality of inter-bonded diamond grains have an average grain size between about 5 μm and about 10 μm.

Embodiment 15

The polycrystalline diamond compact of Embodiment 13 or Embodiment 14, wherein the nanograins of tungsten carbide comprise a monolayer of the tungsten carbide on surfaces of the inter-bonded diamond grains.

Embodiment 16

The polycrystalline diamond compact of any one of Embodiments 13 through 15, wherein the nanograins of tungsten carbide constitute between about 0.01 weight percent and about 1.0 weight percent of the polycrystalline diamond compact.

Embodiment 17

The polycrystalline diamond compact of any one of Embodiments 13 through 16, wherein the metal solvent catalyst comprises cobalt, and the polycrystalline diamond compact comprises between about five parts by weight and about ten parts by weight cobalt per one part by weight tungsten carbide.

Embodiment 18

The polycrystalline diamond compact of any one of Embodiments 13 through 17, wherein the nanograins of tungsten carbide cover less than about one percent of the surface area of the inter-bonded diamond grains.

Embodiment 19

An earth-boring tool, comprising: a bit body; and at least one polycrystalline diamond compact cutting element, the at least one polycrystalline diamond compact cutting element comprising: a plurality of inter-bonded diamond grains; nanograins of tungsten carbide on less than about twenty percent of a surface area of the inter-bonded diamond grains, the nanograins of tungsten carbide having an average grain size of between about 0.2 nm and about 500 nm; and a metal solvent catalyst in spaces between the plurality of inter-bonded diamond grains, the at least one polycrystalline diamond compact cutting element comprising at least five parts by weight of the metal solvent catalyst per one part by weight of the tungsten carbide.

Embodiment 20

The earth-boring tool of Embodiment 19, wherein the tungsten carbide nanograins cover less than about one percent of the surface area of the inter-bonded diamond grains.

While the disclosure is susceptible to various modifications and alternative forms, specific embodiments have been shown by way of example in the drawings and have been described in detail herein. However, the disclosure is not intended to be limited to the particular forms disclosed. Rather, the disclosure is to cover all modifications, equivalents, and alternatives falling within the scope of the disclosure as defined by the following appended claims and their legal equivalents.

What is claimed is:

1. A method of forming a polycrystalline diamond compact, the method comprising:
   providing metallized diamond particles comprising diamond particles including nanograins of a sweep catalyst secured thereto, the sweep catalyst comprising at least one of tungsten and tungsten carbide and constituting between about 0.01 weight percent and about 1.0 weight percent of the metallized diamond particles;
   placing the metallized diamond particles and a metal solvent catalyst in a container; and
   subjecting the metallized diamond particles to a high-temperature, high-pressure process in the presence of the metal solvent catalyst to form a polycrystalline diamond material having inter-bonded diamond grains and nanograins of tungsten carbide, the nanograins of tungsten carbide covering less than about twenty percent of a surface area of the inter-bonded diamond grains.

2. The method of claim 1, wherein placing the metallized diamond particles and a metal solvent catalyst in a container further comprises placing the metallized diamond particles adjacent to a substrate in a container, the substrate including the metal solvent catalyst, the method further comprising enhancing, by the presence of the sweep catalyst secured to the diamond particles, a rate of sweep of the metal solvent catalyst through and between the diamond particles while subjecting the metallized diamond particles to the high-temperature, high-pressure process in the presence of the metal solvent catalyst.

3. The method of claim 1, wherein providing metallized diamond particles comprising diamond particles including nanograins of a sweep catalyst secured thereto comprises providing diamond particles including discrete grains of at least one of tungsten and tungsten carbide having an average grain size of between about 0.2 nm and about 500 nm secured thereto.

4. The method of claim 1, wherein providing metallized diamond particles comprising diamond particles including nanograins of a sweep catalyst secured thereto comprises forming the sweep catalyst on surfaces of the diamond particles by chemical vapor deposition.

5. The method of claim 4, wherein forming the sweep catalyst on surfaces of the diamond particles by chemical vapor deposition comprises exposing the diamond particles to at least one of tungsten hexafluoride, tungsten hexachloride, and tungsten (hexa)carbonyl.

6. The method of claim 1, further comprising selecting the metal solvent catalyst to comprise cobalt.

7. The method of claim 1, further comprising selecting the metallized diamond particles to consist essentially of the diamond particles and tungsten carbide.

8. The method of claim 1, wherein providing metallized diamond particles comprising diamond particles including nanograins of a sweep catalyst secured thereto comprises providing diamond particles having about one monolayer of tungsten or tungsten carbide thereon.

9. The method of claim 1, wherein subjecting the metallized diamond particles to a high-temperature, high-pressure process in the presence of the metal solvent catalyst to form a polycrystalline diamond material comprises forming the polycrystalline diamond material to have tungsten carbide covering less than about five percent of the surface area of the inter-bonded diamond grains.

10. The method of claim 1, wherein subjecting the metallized diamond particles to a high-temperature, high-pressure process in the presence of the metal solvent catalyst to form a polycrystalline diamond material comprises forming the polycrystalline diamond material to have tungsten carbide covering less than about one percent of the surface area of the inter-bonded diamond grains.

11. The method of claim 1, wherein providing metallized diamond particles comprising diamond particles including nanograins of a sweep catalyst secured thereto comprises providing diamond particles coated with nanograins consisting essentially of tungsten carbide.

12. The method of claim 1, further comprising leaching the polycrystalline diamond material to remove at least a portion of the metal solvent catalyst and the sweep catalyst from at least a portion of the polycrystalline diamond material.

13. A method of forming an earth-boring tool, the method comprising:
   providing a bit body; and
   forming at least one polycrystalline diamond compact cutting element, wherein forming at least one polycrystalline diamond compact cutting element comprises:
      providing metallized diamond particles comprising diamond particles including nanograins of a sweep catalyst secured thereto, the sweep catalyst comprising at least one of tungsten and tungsten carbide and constituting between about 0.01 weight percent and about 1.0 weight percent of the metallized diamond particles;
      placing the metallized diamond particles and a metal solvent catalyst in a container; and subjecting the metallized diamond particles to a high-temperature, high-pressure process in the presence of the metal solvent catalyst to form a polycrystalline diamond material having inter-bonded diamond grains and nanograins of tungsten carbide, the nanograins of tungsten carbide covering less than about twenty percent of a surface area of the inter-bonded diamond grains; and securing the at least one polycrystalline diamond compact cutting element to the bit body.

14. The method of claim 13, wherein placing the metallized diamond particles and a metal solvent catalyst in a container further comprises placing the metallized diamond particles adjacent to a substrate in a container, the substrate including the metal solvent catalyst, the method further comprising enhancing, by the presence of the sweep catalyst secured to the diamond particles, a rate of sweep of the metal solvent catalyst through and between the diamond particles while subjecting the metallized diamond particles to the high-temperature, high-pressure process in the presence of the metal solvent catalyst.

15. The method of claim 13, wherein providing metallized diamond particles comprising diamond particles including nanograins of a sweep catalyst secured thereto comprises providing diamond particles including discrete grains of at least one of tungsten and tungsten carbide having an average grain size of between about 0.2 nm and about 500 nm secured thereto.

16. The method of claim 13, wherein providing metallized diamond particles comprising diamond particles including nanograins of a sweep catalyst secured thereto comprises forming the sweep catalyst on surfaces of the diamond particles by chemical vapor deposition.

17. The method of claim 16, wherein forming the sweep catalyst on surfaces of the diamond particles by chemical vapor deposition comprises exposing the diamond particles to at least one of tungsten hexafluoride, tungsten hexachloride, and tungsten (hexa)carbonyl.

18. The method of claim 13, further comprising selecting the metal solvent catalyst to comprise cobalt.

19. The method of claim 13, further comprising selecting the metallized diamond particles to consist essentially of the diamond particles and tungsten carbide.

20. The method of claim 13, wherein providing metallized diamond particles comprising diamond particles including nanograins of a sweep catalyst secured thereto comprises providing diamond particles having about one monolayer of tungsten or tungsten carbide thereon.

* * * * *

UNITED STATES PATENT AND TRADEMARK OFFICE
CERTIFICATE OF CORRECTION

PATENT NO. : 10,227,827 B2
APPLICATION NO. : 14/848619
DATED : March 12, 2019
INVENTOR(S) : Steven W. Webb and Anthony A. DiGiovanni Page 1 of 1

It is certified that error appears in the above-identified patent and that said Letters Patent is hereby corrected as shown below:

In the Specification

Column 6, Line 19, change "about 10 between" to --about 10 µm, between--

Signed and Sealed this
Sixteenth Day of April, 2019

Andrei Iancu
*Director of the United States Patent and Trademark Office*